United States Patent [19]

Weaver et al.

[11] 4,305,874
[45] Dec. 15, 1981

[54] ANILINE AZO DYES FROM 1,2,3,4-TETRAHYDROQUINOLINE AND 2,3-DIHYDRO-1,4-BENZOXAZINE COUPLERS CONTAINING SULFATE ALKYL GROUPS

[75] Inventors: Max A. Weaver; Ralph R. Giles, both of Kingsport, Tenn.

[73] Assignee: Eastman Kodak Company, Rochester, N.Y.

[21] Appl. No.: 94,144

[22] Filed: Nov. 14, 1979

[51] Int. Cl.³ .................... C09B 29/01; C09B 29/36; C09B 29/44; D06P 3/06
[52] U.S. Cl. .................... 260/152; 260/156; 260/157; 260/205; 260/206; 260/207; 260/207.1; 260/207.3; 260/458 C; 544/104; 546/159
[58] Field of Search .............. 260/152, 157, 156, 155, 260/205, 206, 207, 207.1, 207.3, 186, 187

[56] References Cited
U.S. PATENT DOCUMENTS

| | | | |
|---|---|---|---|
| 2,231,021 | 2/1941 | McNally et al. | 260/205 |
| 2,249,749 | 7/1941 | Dickey et al. | 260/152 |
| 2,249,774 | 7/1941 | McNally et al. | 260/155 |
| 2,251,947 | 8/1941 | McNally et al. | 260/155 |
| 2,387,987 | 10/1945 | Felix et al. | 260/205 |
| 2,432,393 | 12/1947 | Dickey et al. | 260/207.5 |

FOREIGN PATENT DOCUMENTS 546017 6/1942 United Kingdom ................ 260/155

*Primary Examiner*—Floyd D. Higel
*Attorney, Agent, or Firm*—Donald W. Spurrell; Daniel B. Reece, III

[57] ABSTRACT

Disclosed are novel dyes which comprise aniline diazo moieties and certain aromatic amine couplers having sulfate groups. These dyes are substantially water soluble and are particularly useful for dyeing polyamide, wool and the like and exhibit, for example, excellent dyeability properties and fastness to light and gas. The dyes correspond to the general formula:

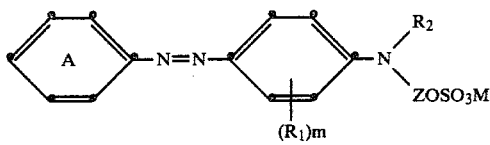

wherein ring A may be unsubstituted or substituted with 1-3 of a variety of groups which themselves may be substituted such as alkyl, alkoxy, chloro, bromo, iodo, trifluoromethyl, thiocyano, cyano, phenylazo, acyl, and the like; $R_1$ is a group such as alkyl, alkoxy, halogen, acylamido, alkylthio, and aryloxy; m is 0, 1, or 2; $R_2$ represents the linking groups necessary to form a 1,2,3,4-tetrahydroquinoline or a 2,3-dihydro-1,4-benzoxazine structure, which may be substituted, in combination with the phenylene ring; Z is a linking group such as alkylene; and M is $H^+$, $Na^+$, $K^+$, or $NH_4^+$.

6 Claims, No Drawings

ANILINE AZO DYES FROM 1,2,3,4-TETRAHYDROQUINOLINE AND 2,3-DIHYDRO-1,4-BENZOXAZINE COUPLERS CONTAINING SULFATE ALKYL GROUPS

This invention concerns novel dyes which comprise aniline diazo moieties and certain aromatic amine couplers having sulfate groups. These dyes are substantially water soluble and are particularly useful for dyeing polyamide, wool and the like and exhibit, for example, excellent dyeability properties and fastness to light and gas.

The dyes of this invention correspond to the following general formula:

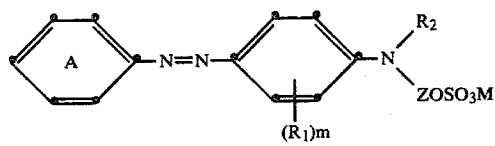

wherein ring A may be unsubstituted or substituted with 1-3 groups selected from alkyl, alkoxy, chloro, bromo, iodo, trifluoromethyl, thiocyano, cyano, phenylazo, acyl, aroyl, carbamoyl, sulfamoyl, alkylsulfonyl, alkenylsulfonyl, arylsulfonyl, alkylthio, arylthio, aryloxy, alkoxycarbonyl, arylamido, aryloxycarbonyl, COO-alkylene-X, CONH-alkylene-X,

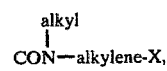

SO$_2$NH-alkylene-X,

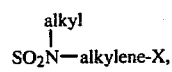

SO$_2$-alkylene-X, SO$_2$N(alkyl)$_2$,

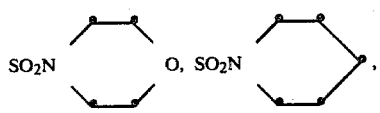

SO$_2$O-aryl, formyl, and NHSO$_2$-alkyl, wherein X is one or more groups selected from hydrogen, hydroxy, halogen, aryl, cycloalkyl, alkoxy, aryloxy, acylamido, cyano, alkoxyalkoxy, acyloxy, succinimido, alkylsulfonomido, 2-pyrrolidino, alkylthio, and arylthio; R$_1$ is selected from alkyl, alkoxy, halogen, acylamido, alkylthio, and aryloxy; m is 0, 1, or 2; R$_2$ represents the linking groups necessary to form a 1,2,3,4-tetrahydroquinoline or a 2,3-dihydro-1,4-benzoxazine structure in combination with the phenylene ring; Z is a linking group such as alkylene; and M is H$^+$, Na$^+$, K$^+$, or NH$_4^+$. The aliphatic portions of the various alkyl, alkylene, alkenyl, alkoxy, alkanoyl and the like groups throughout this specification, are straight or branched chain of 1-6 carbons and the types and degrees of substitutions thereof and also of the cyclic moieties as further defined below must, of course, be judiciously selected.

The couplers are described more particularly by the following formulae:

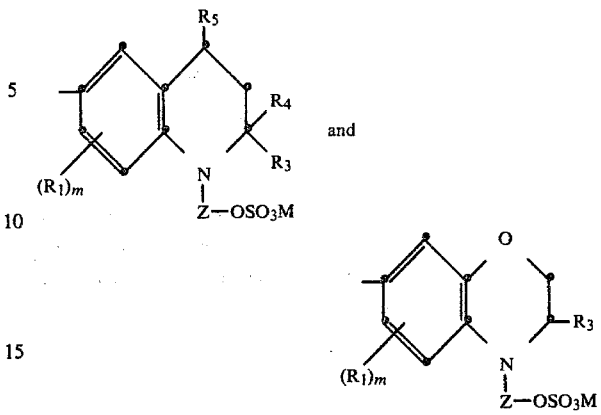

wherein
R$_1$ is selected from hydrogen, alkyl, alkoxy, halogen, acylamido, alkylthio, and aryloxy;
R$_3$, R$_4$ and R$_5$ are each selected from hydrogen and alkyl; m is 0, 1 or 2; M is Na$^+$, K$^+$, H$^+$ or NH$_4^+$; and Z is alkylene, or —CH$_2$(CH$_2$)$_n$X—CH$_2$(CH$_2$)$_p$—, where n is 1, 2 or 3, p is 0, 1, 2 or 3, and X is O, S, SO$_2$, —SO$_2$NH—, —SO$_2$N(alkyl)—, SO$_2$N(aryl), —N(SO$_2$ aryl)—, —NHCO—, —NHCONH, —N(SO$_2$ alkyl), or —CON(alkyl).

All of the aforesaid "aliphatic portions" of the various alkyl, etc., groups and the various aromatic and alicyclic radicals may be substituted, for example, with up to three of aryl, phenyl, halogen, OSO$_3$M, alkoxy, aryloxy, hydroxy, cyclohexyl, furyl, alkylcyclohexyl, aroyloxy, alkoxycarbonyl, alkanoyloxy, sulfamoyl, SO$_2$NH(aryl), SO$_2$NH(alkyl), SO$_2$N(dialkyl), NHCOO(alkyl), NHCONH(alkyl), acylamido, alkylsulfonamido, succinimido, glutarimido, phthalimido, 2-pyrrolidono, cyano, carbamoyl, alkylcarbamoyl, alkoxyalkoxy, alkylthio, arylthio, alkylsulfonyl or arylsulfonyl.

The dyes of this invention impart orange to blue shades on fibers, particularly polyamides, and are especially useful for dyeing polyamide (nylon) carpets, giving good fastness to light, ozone, oxides of nitrogen, washing, sublimation, crocking, and the like, and having good leveling, transfer, depth of shade, exhaustion and build properties.

The substituted anilines used in this invention are prepared according to known procedures. The dyes may be prepared as follows:

Method I: An intermediate coupler containing one or more hydroxy groups may be reacted with sulfuric acid to produce a sulfate ester, which is then coupled with a diazonium salt to give the dye, as follows:

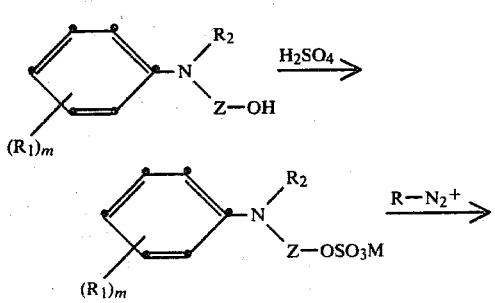

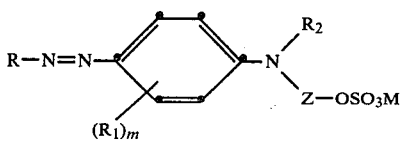

Method II: An intermediate coupler containing one or more hydroxy groups may be coupled with the diazonium salt and then the dye reacted with sulfuric acid to produce the sulfate ester, as follows:

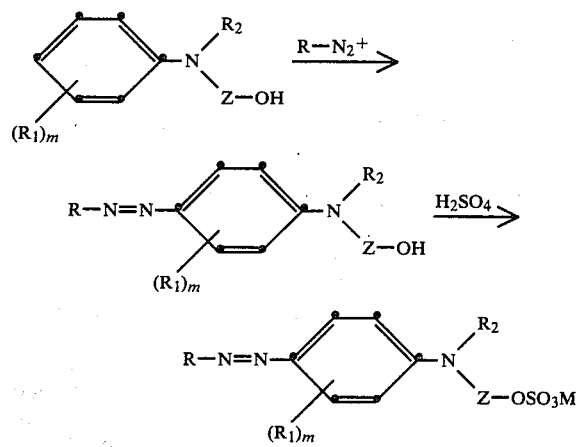

The dyes may be isolated when M is H+, but are usually isolated as the sodium or potassium salts. The following examples will further illustrate these preparative methods.

COUPLER PREPARATIONS

Example 1

Preparation of 2,7-Dimethyl-N-(2,3-disulfatopropyl)1,2,3,4-tetrahydroquinoline

To 40 g. of concentrated sulfuric acid is added 11.75 g. of N-(2,3-dihyroxypropyl)-2,7-dimethyl-1,2,3,4-tetrahydroquinoline at about 50° C. The material is difficult to dissolve and requires stirring for several hours at room temperature. After solution is completed, stirring is continued for 1 hr.

Example 2

Preparation of N-(2-Sulfatoethyl)-1,2,3,4-tetrahydro-2,2,4,7-tetramethylquinoline To 250 ml of concentrated sulfuric acid is added 120 g. of N-(2-hydroxyethyl)-1,2,3,4-tetrahydro-2,2,4,7-tetramethylquinoline at less than 30° C. The solution is stirred for 2 hrs. and drowned onto 1250 g. of ice and water. After stirring for about 30 min., the white solid which precipitates is collected by filtration, washed with 10% sodium chloride solution, and dried at 60° C.

Example 3

Preparation of N-(2-Sulfatoethyl)-1,2,3,4-tetrahydro-2,2,4-trimethylquinoline

N-(2-Hydroxyethyl)-1,2,3,4-tetrahydro-2,2,4-trimethylquinoline (110 g.) is treated exactly as in Example 2 to yield the sulfate product which is a white solid.

Example 4

Preparation of N-(2-Sulfatoethyl)-2,3-dihydro-3,6-dimethyl-1,4-benzoxazine

N-(2-Hydroxyethyl)-2,3-dihydro-3,6-dimethyl-1,4-benzoxaine (25 g.) is added at about 30° C. to concentrated sulfuric acid (50 ml). After solution is complete, stirring is continued for 1 hr. and the reaction solution drowned in ice-water to produce a total volume of about 500 ml. The coupler solution is used without further treatment.

The following are typical coupler types bearing hydroxy groups which may be treated in a similar manner as described above to produce sulfate groups.

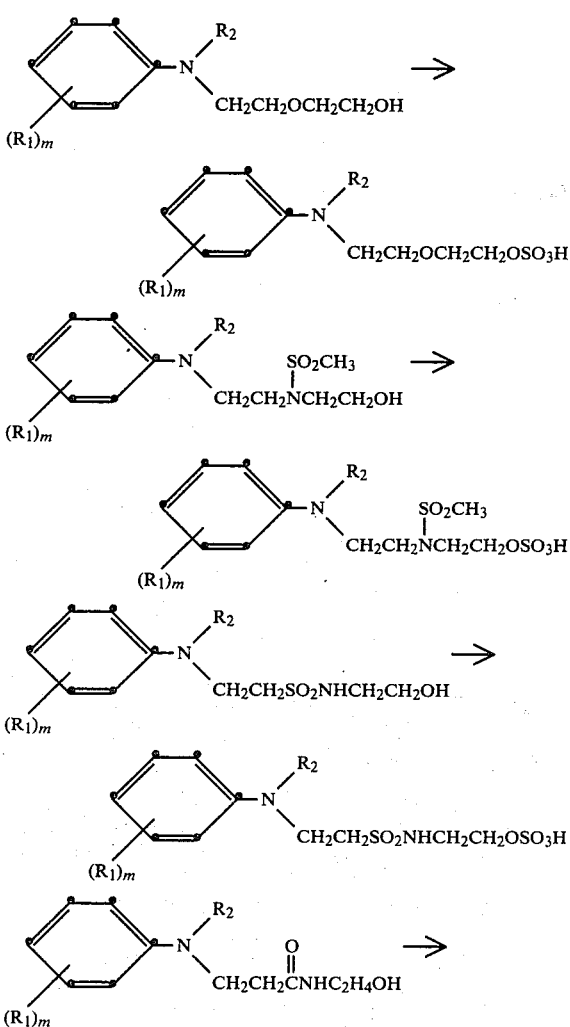

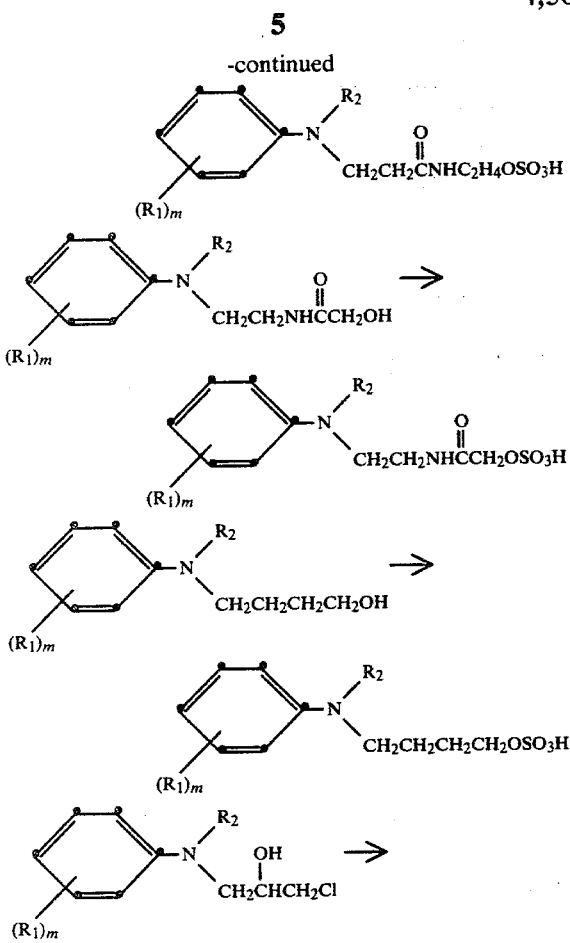

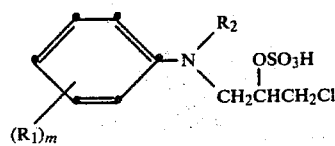

PREPARATION OF THE DYES—METHOD I

Examples 5-9

To 25 ml of concentrated $H_2SO_4$ is added 3.6 g. of $NaNO_2$ portionwise below 80° C. The solution is cooled and 50 ml of 1:5 acid (1 part propionic acid; 5 parts acetic acid) is added below 20° C. To the mixture is added 2-chloro-4-methylsulfonylaniline (10.28 g., 0.05 m) followed by 50 ml 1:5 acid, all at 0°-5° C. The reaction mixture is stirred at 0°-5° C. for 2 hrs. Each of the couplers (0.01 m) listed below is Examples 5-9 is added to water, or a 0.01 m aliquot of the coupler in dilute $H_2SO_4$ is added to water and cooled in an ice bath.

To each chilled coupler is added a 0.01 mole aliquot of the diazonium solution. The coupling mixture is treated with enough potassium acetate to neutralize the mineral acid. Water is added to the coupling mixture to a total volume of about 200 ml and the dyes coolected by filtration, washed with 10% KCl solution, and dried in air. The dyes usually are admixed with about an equal weight of $K_2SO_4$ and are used for dyeing without further purification to produce red shades on polyamides.

| EXAMPLE NO. | |
|---|---|
| 5 | N-(2-Sulfatoethyl)-1,2,3,4-tetrahydro-2,2,4-trimethylquinoline |
| 6 | N-(2-Sulfatoethyl)-1,2,3,4-tetrahydro-2,2,4,7-tetramethylquinoline |
| 7 | N-(2-Sulfatoethyl)-2,7-dimethyl-1,2,3,4-tetrahydroquinoline |
| 8 | 2,3-Dihydro-3,6-dimethyl-N-(2-sulfatoethyl)-1,4-benzoxazine |
| 9 | 2,3-Dihydro-3-methyl-N-(2-sulfatoethyl)-1,4-benzoxazine |

PREPARATION OF DYES—METHOD II

Example 10

Reaction of Hydroxy-Containing Dye With Sulfuric Acid and Sodium Hydroxide

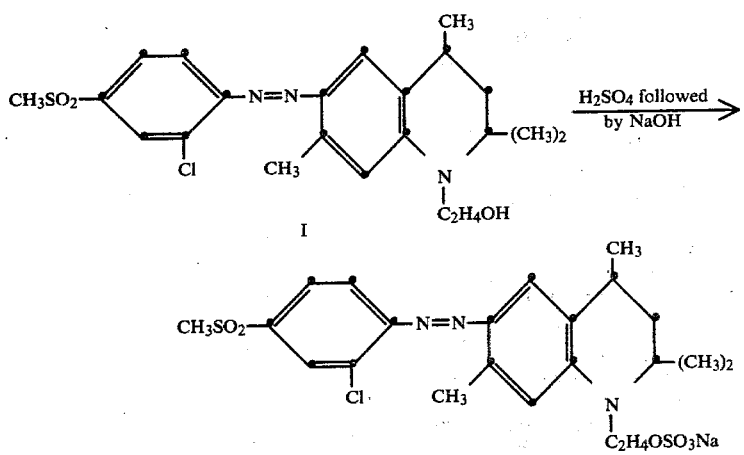

To 15 ml of concentrated $H_2SO_4$ is added 2.5 g of Dye I portionwise and stirring continued for 30 min. at about 30° C. The solution is added to 75 g of ice with stirring. The dye is collected by filtration. The wet filter cake is stirred in 150 ml of water and pH is adjusted to about 13 by addition of 50% NaOH solution. The sodium salt of the dye is then collected by filtration, washed with saturated NaCl solution, and dried by heating at 60° C. The dye produces a bright yellowish red shade when dyed on nylon carpet. The dyes in the following tables are prepared in a similar manner. In the tables in the $(R_1)_m$ column, the word "none" means —H.

TABLE I

[Structure: Ring A—N=N—[benzene with (R₁)ₘ]—CH(R₅)—C(R₄)(R₃)—N(Z—OSO₃M)]

| Substituents on Ring A | (R₁)ₘ | R₃ | R₄ | R₅ | Z | M |
|---|---|---|---|---|---|---|
| 2-Cl | None | CH₃ | CH₃ | CH₃ | —CH₂CH₂— | K⁺ |
| 2-CH₃—5-Cl | " | H | CH₃ | " | " | " |
| 2,5-di-CH₃ | 7-CH₃ | " | " | H | " | " |
| 2-CN—4-SO₂CH₃ | " | CH₃ | " | " | " | " |
| 2,4-di-SO₂CH₃ | 7-CH₃ | H | CH(CH₃)₂ | " | " | " |
| 4-SO₂OC₆H₅ | 7-OCH₃ | " | CH₃ | " | " | " |
| 2-COC₄H₅ | 5-OCH₃, 8-CH₃ | " | " | " | " | " |
| 2-CO₂C₄H₅ | 5,8-di-OCH₃ | " | " | CH₃ | " | " |
| 4-SO₂CH₃ | 5,8-di-CH₃ | " | " | " | " | " |
| 2,6-di-Cl—4-SO₂CH₃ | 7-Cl | " | " | " | " | " |
| 2-CN—4-Cl | 5,8-diCl | " | " | " | " | " |
| 2-CN—5-Cl | None | " | " | " | " | Na⁺ |
| 4-COCH₃ | 5-OCH₃, 8-CH₃ | CH₃ | " | " | " | " |
| 4-CN | 7-NHCHO | " | " | " | " | " |
| 4-CHO | 7-NHCOCH₃ | " | " | H | " | " |
|  | 7-NHCOCH₂OCH₃ | " | " | " | " | " |
| 4-N=N—<phenyl> |  |  |  |  |  |  |
| 2-CN—4-SO₂NH₂ | 7-NHCOOC₂H₅ | " | " | " | " | " |
| 2-CN—4-COCH₃ | 7-NHCOC₆H₅ | " | " | " | " | " |
| 2-CN—4-COOC₂H₅ | 7-NHCONHC₂H₅ | " | " | " | " | K⁺ |
| 2-CN—4-SCN | 7-NHCOC₆H₁₁ | " | " | CH₃ | " | " |
| 2-COOCH₃—4-SCN | None | " | " | " | " | " |
| 2,4-di-CN | 7-CH₃ | H | " | " | " | " |
| 2,4,6-tri-CN | " | " | H | " | " | " |
| 2,6-di-CN | " | " | CH₃ | " | " | " |
| 2-Br—4-SO₂NHC₃H₆OCH₃ | " | " | " | " | " | " |
| 4-SO₂N(C₂H₅)₂ | " | " | " | " | " | " |
| 4-CO₂C₂H₄OC₂H₄CN | " | " | " | H | " | " |
| 4-SO₂NHC₂H₄NHCOCH₃ | " | " | " | " | " | " |
| 4-SO₂N<ring> | 7-OCH₃ | " | " | " | " | " |
| 2-COOCH₂—<phenyl> | 7-CH₃ | " | " | " | " | " |
| 2-SC₆H₅—4-CN | " | " | " | " | " | " |
| 2-OC₆H₅—4-Cl | " | " | " | " | " | " |
| 4-NHCOCH₃ | " | " | " | " | " | " |
| 2-CO₂CH₂CH₂OCH₂CH₃ | " | " | " | " | " | " |
| 2-COOCH₃—4-SO₂CH₃ | " | " | " | " | " | " |
| 2-SCH₃—4-Cl | None | " | " | " | " | " |
| 2-CN—4-CONH₂ | " | " | " | " | " | " |
| 2-CONHC₂H₄OH—4-Cl | " | " | " | " | " | " |
| 2-CO₂CH₃—4,6-di-Br | " | " | " | CH₃ | " | " |
| 4-CO₂CH₂CH₂N(CO—CH₂—CH₂CH₂) | 7-CH₃ | " | " | " | " | " |
| 4-SO₂NHC₂H₄NHCOCH₃ | " | " | " | " | " | " |
| 4-SO₂N(CH₃)C₂H₄OH | " | " | " | " | —CH₂CH₂OCH₂CH₂— | " |
| 2,6-di-CN—4-SO₂CH₃ | " | " | " | " | —CH₂CH₂SCH₂CH₂— | " |
| 2,6-di-CN—4-Cl | " | " | " | H | —CH₂CH₂SO₂CH₂CH₂— | " |
| 2,6-di-CN—4-CHO | " | " | " | " | —CH₂CH₂N(SO₂CH₃)CH₂CH₂— | " |
| 2-Cl—4-SO₂CH₃ | " | " | " | " | —CH₂CH₂SO₂NHCH₂CH₂— | " |
| " | " | " | " | " | —CH₂CH₂CH₂NHCOCH₂— | " |
| " | " | " | " | " | —CH₂CH₂CONHCH₂CH₂— | " |
| " | " | " | " | " | —CH₂CH₂N(COC₆H₅)CH₂CH₂— | " |
| " | " | " | " | " | —CH₂CH(CH₃)— | " |
| " | " | " | " | " | —CH₂CH(OSO₃Na)CH₂— | Na⁺ |
| " | " | " | " | " | —CH₂CH(CH₂Cl)— | " |
| " | " | " | " | " | —CH₂CH(CH₂OCH₃)— | " |
| " | " | " | " | " | —CH₂CH(C₆H₅)— | " |
| " | " | " | " | " | —CH₂CH(CH₂OC₆H₅)— | " |
| " | " | " | " | " | —CH₂CH₂CH₂N(CH₃)SO₂CH₂CH₂— | " |

TABLE I-continued

| Substituents on Ring A | $(R_1)_m$ | $R_3$ | $R_4$ | $R_5$ | Z | M |
|---|---|---|---|---|---|---|
| " | " | " | " | " | —CH₂CH₂CH₂— | " |

| Substituents on Ring A | $(R_1)_m$ | $R_3$ | Z | M |
|---|---|---|---|---|
| 4-Cl | None | H | —CH₂CH₂— | Na⁺ |
| 2,5-di-Cl | 6-CH₃ | " | " | " |
| 2,5-di-CH₃ | " | —CH₃ | " | " |
| 2-CN—4-SO₂CH₃ | 6-OCH₃ | " | " | " |
| 4-SO₂C₂H₅ | " | H | " | " |
| 2,6-di-Cl—4-SO₂CH₃ | 6-CH₃ | —CH₃ | —CH₂CH₂CH₂CH₂— | " |
| 2-CN—4-Cl | " | " | —CH₂CH₂— | " |
| 2-SO₂C₆H₅ | " | " | " | " |
| 4-COCH₃ | " | " | " | " |
| 2-COOCH₃ | " | " | " | " |
| 2-COOCH₃—4-Cl | " | " | " | " |
| 2-CONHC₂H₅ | " | " | " | " |
| 2-Br—4-CONH₂ | " | " | " | " |
| 2-CN—4-COCH₃ | " | " | " | " |
| 2-CN—4-COOC₂H₅ | 6-NHCOCH₃ | " | " | K⁺ |
| 2-COOCH₃—4-SCN | 6-NHCOC₆H₅ | " | " | " |
| 2-CN—4-SCN—2-COOCH₃ | 6-NHCOC₄H₅—n | " | " | " |
| 4-SO₂NH₂ | 6-NHCONHC₂H₅ | " | " | " |
| 2-Cl—5-SO₂NHC₂H₄OH | 6-NHCOCH₂OCH₃ | " | " | " |
| 4-SO₂OC₆H₅ | 6-NHCOCH₂CN | " | " | " |
| 2-Br—4-SO₂N(C₂H₅)₂ | 6-CH₃ | " | " | Na⁺ |
| 4-N=N—C₆H₅ | " | " | " | " |
| 4-NHCOCH₃ | " | " | " | " |
| 2,4-di-CN | " | " | " | " |
| 2,4,6-tri-CN | " | " | " | " |
| 2,6-di-CN | " | " | " | " |
| 4-COOC₂H₄OH | " | " | " | " |
| 4-COOC₃H₆OCH₃ | " | " | " | " |
| 4-SO₂NHCH₂CH(OH)CH₂OH | " | " | " | " |
| 4-CO₂C₂H₄N(COCH₂)(COCH₂) | 6-NHCHO | " | " | " |
| 4-CO₂C₂H₄OC₂H₄OC₂H₅ | 6-CH₃ | " | " | " |
| 2-CO₂CH₂CH₂C₆H₅ | " | " | " | " |
| 2-CO₂CH₂CH₂OC₆H₅ | " | " | " | " |
| 4-SO₂CH₂CH=CH₂ | " | " | " | " |
| 2-SC₄H₉—n-4-Cl | " | " | " | " |
| 2-S—C₂H₅—4-CN | " | " | " | " |
| 2-O—C₆H₅—4-COCH₃ | " | " | " | " |
| 4-SO₂N(morpholino) | " | " | " | " |
| 2-OCH₃—4-Cl—6-CN | " | " | —CH₂CH(CH₃)— | " |
| 4-COOC₆H₁₁ | " | " | —CH₂CH(C₆H₅)— | " |
| 4-COOC₆H₅ | " | " | —CH₂CH(CH₂Cl)— | " |
| 2,6-di-CN—5-CHO | " | " | —CH₂CH(OSO₃K)CH₂— | " |
| 2,6-di-CN—4-CH₃ | " | " | —CH₂CH(CH₂OC₆H₅)— | " |

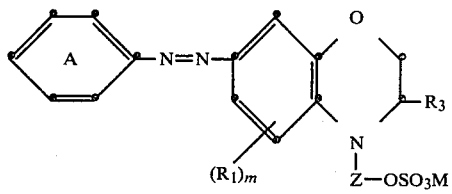

| Substituents on Ring A | $(R_1)_m$ | $R_3$ | Z | M |
|---|---|---|---|---|
| 2-Cl—4-SO$_2$CH$_3$ | " | " | —CH$_2$CH$_2$OCH$_2$CH$_2$— | " |
| " | " | " | —CH$_2$CH$_2$SCH$_2$CH$_2$— | " |
| " | " | " | —CH$_2$CH$_2$SO$_2$CH$_2$CH$_2$— | " |
| " | " | " | —CH$_2$CH$_2$N(SO$_2$CH$_3$)CH$_2$CH$_2$— | " |
| " | " | " | —CH$_2$CH$_2$N(SO$_2$C$_6$H$_5$)CH$_2$CH$_2$— | " |
| " | " | " | —CH$_2$CH$_2$SO$_2$N(CH$_3$)CH$_2$CH$_2$— | " |
| " | " | " | —CH$_2$CH$_2$NHCOCH$_2$— | " |
| " | " | " | —CH$_2$CH$_2$CH$_2$NHSO$_2$CH$_2$CH$_2$— | " |
| " | " | " | —CH$_2$CH$_2$CONHCH$_2$CH$_2$— | " |
| " | " | " | —CH$_2$CH$_2$CONHCH$_2$CH$_2$CH$_2$CH$_2$— | " |
| " | " | " | —CH$_2$CH$_2$SO$_2$N(C$_6$H$_5$)CH$_2$CH$_2$— | " |
| " | " | " | —CH$_2$CH$_2$NHCONHCH$_2$CH$_2$— | " |
| " | " | " | —CH$_2$CH$_2$CH$_2$— | " |
| 2,4-di-CH$_3$SO$_2$ | " | " | —CH$_2$CH$_2$CH$_2$CH$_2$—S—CH$_2$CH$_2$— | " |

The invention has been described in detail with particular reference to preferred embodiments thereof, but it will be understood that variations and modifications can be effected within the spirit and scope of the invention.

We claim:

1. The dye of the formula:

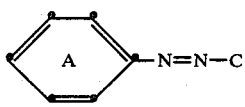

wherein ring A is unsubstituted or substituted with 1–3 groups selected from alkyl, alkoxy, chloro, bromo, iodo, trifluoromethyl, thiocyano, cyano, phenylazo, alkanoyl, aroyl, carbamoyl, sulfamoyl, alkylsulfonyl, alkenylsulfonyl, arylsulfonyl, alkylthio, arylthio, aryloxy, alkoxycarbonyl, arylamido, aryloxycarbonyl, COO-alkylene-X, CONH-alkylene-X,

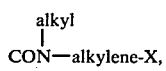

SO$_2$NH-alkylene-X,

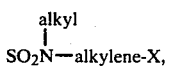

SO$_2$-alkylene-X, SO$_2$N(alkyl)$_2$,

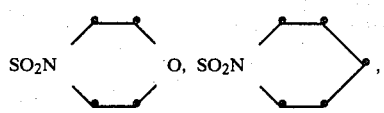

SO$_2$O-aryl, formyl, and NHSO$_2$-alkyl, wherein X is one or more groups selected from hydrogen, hydroxy, halogen, aryl, cycloalkyl, alkoxy, aryloxy, alkanoylamino, cyano, alkoxyalkoxy, alkanoyloxy, succinimido, alkylsulfonamido, 2-pyrrolidino, alkylthio and arylthio; and wherein the coupler C has the formula:

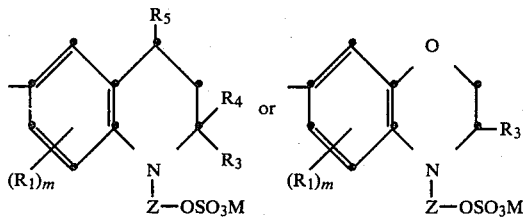

wherein
R$_1$ is selected from hydrogen, alkyl, alkoxy, halogen, alkanoylamino, alkylthio, and aryloxy;
R$_3$, R$_4$ and R$_5$ are each selected from hydrogen and alkyl;
Z is alkylene or —CH$_2$(CH$_2$)$_n$X-CH$_2$(CH$_2$)$_p$—, where n is 1, 2 or 3, p is 0, 1, 2 or 3, and X is O, S, SO$_2$, —SO$_2$NH—, —SO$_2$N(alkyl)—, SO$_2$N(aryl)—, —N(SO$_2$ aryl)—, —NHCO—, —NHCONH—, —N(SO$_2$ alkyl)—, or —CON(alkyl)—; M is H$^+$, Na$^+$, K$^+$ or NH$_4^+$; m is 0, 1 or 2; wherein the alkyl, alkoxy, alkanoyl and aryl substituents of R$_1$, R$_3$, R$_4$, R$_5$, and Z are unsubstituted or substituted with up to three of the following groups: aryl, halogen, OSO$_3$M, alkoxy, aryloxy, hydroxy, cyclohexyl, furyl, alkylcyclohexyl, aroyloxy, alkoxycarbonyl, alkanoyloxy, sulfamoyl, SO$_2$NH(aryl), SO$_2$NH(alkyl), SO$_2$N(dialkyl), NHCOO(alkyl), NHCONH(alkyl), alkanoylamino, alkylsulfonamido, succinimido, glutarimido, phthalimido, 2-pyrrolidono, cyano, carbamoyl, alkylcarbamoyl, alkoxyalkoxy, alkylthio, arylthio, alkylsulfonyl or arylsulfonyl; wherein each of the alkyl, alkylene and alkenyl portions of the above groups contain 1–6 carbons, and is straight or branched chain.

2. The compound according to claim 1 of the formula

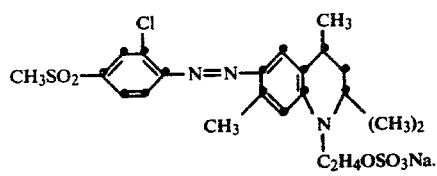
3. The compound according to claim 1 of the formula
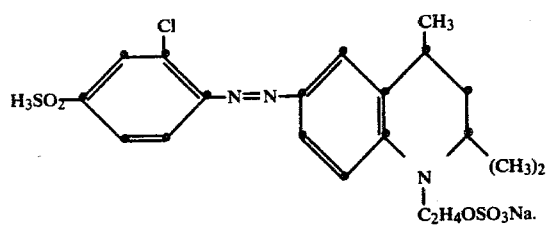
4. The compound according to claim 1 of the formula
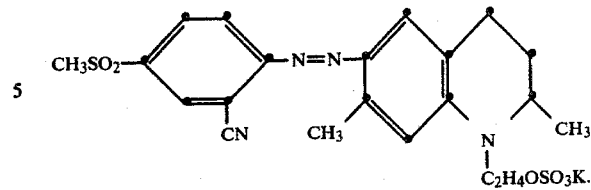
5. The compound according to claim 1 of the formula
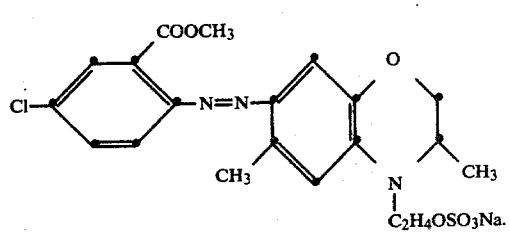
6. The compound according to claim 1 of the formula
* * * * *

UNITED STATES PATENT AND TRADEMARK OFFICE
CERTIFICATE OF CORRECTION

PATENT NO. : 4,305,874
DATED : December 15, 1981
INVENTOR(S) : Max A. Weaver and Ralph R. Giles It is certified that error appears in the above—identified patent and that said Letters Patent is hereby corrected as shown below:

Column 13, lines 20-30, the formula of claim 3 should read

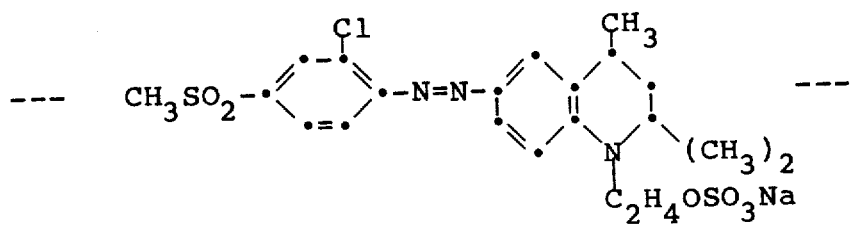

Signed and Sealed this

Eleventh Day of January 1983

[SEAL]

Attest:

GERALD J. MOSSINGHOFF

Attesting Officer

Commissioner of Patents and Trademarks